United States Patent [19]

Mori

[11] 3,781,119

[45] Dec. 25, 1973

[54] DUAL LIGHT-MEASUREMENT AND COMPENSATION CIRCUITRY FOR CAMERAS

[75] Inventor: Chiharu Mori, Tokyo, Japan

[73] Assignee: Asahi Kogaru Kogyo Kabushiki Kaisha, Itabashi-ku, Tokyo-to, Japan

[22] Filed: Feb. 9, 1972

[21] Appl. No.: 224,719

[30] Foreign Application Priority Data

Feb. 22, 1971 Japan .................................. 46/8483

[52] U.S. Cl. ............... 356/222, 95/10 C, 95/10 CT, 250/214 P, 356/223, 356/229

[51] Int. Cl. ............................ G01j 1/42, G01j 1/10

[58] Field of Search .................... 356/221, 222, 223, 356/229; 250/214 P; 95/10 C, 10 PO, 10 CT

[56] References Cited

UNITED STATES PATENTS

| | | | |
|---|---|---|---|
| 3,678,825 | 7/1972 | Nobusawa | 95/10 CT |
| 3,594,683 | 7/1971 | Ihaya | 356/223 |
| 2,273,356 | 2/1942 | Holven et al. | 356/222 |

*Primary Examiner*—David Schonberg
*Assistant Examiner*—V. P. McGraw
*Attorney*—Harold D. Steinberg et al.

[57] ABSTRACT

A light-measurement circuit to be used with cameras for determining the extent to which film is exposed. The light-measurement circuit has internal and external photosensitive structures for respectively receiving light inputs from an object to be photographed. The internal photosensitive structure receives the light input after the latter has passed through the camera objective while the external photosensitive structure receives a light input which does not pass through the objective. The external photosensitive structure can continue to receive a light input up to and during actual exposure of film while the internal photosensitive structure can receive a light input only prior to actual exposure of the film. These photosensitive structures are arranged to provide logarithmically transformed outputs which correspond to the light inputs received thereby, and these outputs are transmitted to a capacitor which is charged in accordance with the difference between the outputs. When film is actually exposed, an output determined by the capacitor and the external photosensitive structure is used to compute and determine the extent to which film is exposed, and as a result the output from the external photosensitive structure is compensated in accordance with the output from the internal photosensitive structure.

9 Claims, 7 Drawing Figures

PATENTED DEC 25 1973 3,781,119

DUAL LIGHT-MEASUREMENT AND COMPENSATION CIRCUITRY FOR CAMERAS

BACKGROUND OF THE INVENTION

The present invention relates to cameras.

In particular, the present invention relates to circuits for measuring light so as to be able to automatically determine the extent to which film in a camera is exposed.

The invention is particularly applicable to single lens reflex cameras having shutter-controlling circuits for automatically determining the exposure.

In conventional cameras of this type an internal light-receiving structure is provided to receive light which has passed through the objective of the camera. This light which has passed through the objective is reflected by a tiltable mirror of the camera away from the optical axis, usually to a photosensitive structure which may be located in the viewfinder, for example, for the purpose of measuring the light simultaneously with viewing the object to be photographed through the viewfinder. As is well known, when the shutter-operating button of the camera is depressed to trip the shutter and cause an exposure to be made, this mirror will swing up away from the optical axis so that light can travel through the objective directly through the film to expose the latter when the shutter is open. In accordance with the information received by the photosensitive structure which responds to the light which has passed through the objective and which is reflected by the mirror, the extent of exposure of the film is determined automatically in a well known manner.

One of the serious drawbacks encountered with this type of structure is that it is not possible to take into consideration variation in light during exposure. In other words with a structure of the above type the light measurement is terminated when the mirror is swung up away from the optical axis so that it becomes possible to expose the film, and if the conditions are such that the light is continuously changing it is not possible to vary the exposure in accordance with a light intensity which changes after the mirror has swung up and the photosensitive structure stops responding to light from the object which is photographed. It is therefore impossible to achieve controls in accordance with brightness of the object during exposure time.

The above conditions are of course applicable to exposure using daylight which can continuously vary to an appreciable extent. However, the problem is also encountered with flash exposure since the flash illumination is synchronized with opening of the shutter, so that particularly with flash illumination the known constructions of the above type are not effective.

SUMMARY OF THE INVENTION

It is accordingly a primary object of the present invention to provide a structure which will avoid the above drawbacks.

In particular it is an object of the present invention to provide for a camera a light-measuring circuit arrangement which will enable measurement of light from the object to be continued not only through an interval just prior to actual film exposure but also during film exposure. Thus, it is an object of the invention to provide a camera which can operate effectively to determine automatically the exposure of film not only with daylight illumination but also with flash illumination, or other artificial illumination.

It is also an object of the present invention to provide circuitry which can accomplish the above objects and which at the same time assures a speed of response which is rapid enough to achieve the desired results.

Yet another object of the present invention is to provide a structure of the above type in which the temperature dependencies of the light receiving elements will cancel each other to bring about an automatic compensation.

Also, the objects of the present invention include the provision of a circuitry which can utilize any known types of light-receiving elements such as photovoltaic elements or photoconductive elements, or both, to achieve the desired results, so that a wide range of flexibility is presented in the choice of elements to be used in a circuit of the invention.

In accordance with the invention, the camera includes an internal photosensitive means for receiving a light input from an object which is to be photographed after the light input has passed through an objective of the camera, this internal photosensitive means providing from the light input a corresponding logarithmically transformed output. An external photosensitive means is provided for receiving from the object which is to be photographed a light input which does not pass through the objective of the camera, this external photosensitive means coverting its light input into a corresponding logarithmically transformed output. Both of these photosensitive means have the same photoelectric transformation characterics. The external photosensitive means receives a light input during a time interval prior to and during exposure of film while the internal photosensitive means receives a light input prior to but not during exposure of the film. A capacitor means is electrically connected between the internal and external photosensitive means for receiving a charge corresponding to the difference between the outputs. An output means is provided to achieve a signal to be used in computation of the extent to which film is exposed, and this output means is electrically connected with the capacitor means and with the external photosensitive means to provide the signal for computation after light input to the internal photosensitive means has terminated. In this way the signal from the external photosensitive means will be compensated in accordance with the light input to the internal photosensitive means as a result of the charge on the capacitor means.

BRIEF DESCRIPTION OF DRAWINGS

The invention is illustrated by way of example in the accompanying drawings which form part of this application and in which.

DESCRIPTION OF PREFERRED EMBODIMENTS

Figure 1A:
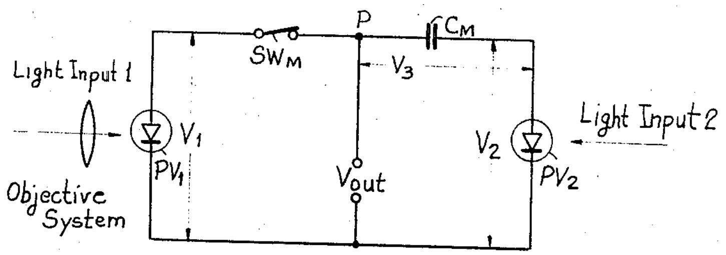
FIGS. 1*a*–1*d* respectively illustrate examples of fundamental circuits according to the present invention.

Referring now to the drawings, FIG. 1*a* shows one embodiment of a fundamental circuit according to the present invention. In this embodiment there are a pair of photosensitive means respectively formed by the light-receiving elements $PV_1$ and $PV_2$. The pair of photosensitive means $PV_1$, $PV_2$ have equal photoelectric transformation characteristics. In the illustrated example each of the photosensitive means is in the form of a silicon photocell which has the characteristic of being proportional to the logarithm of the light input intensity. In addition to the pair of photosensitive means $PV_1$ and $PV_2$, the circuit of FIG. 1*a* includes a capacitor means $C_M$ for retaining and storing a charge, as described in greater detail below, and a switch means $SW_M$ for bringing about the retaining or storing operation of the capacitor means. As is illustrated in FIG. 1*a*, the pair of photosensitive means and the capacitor means and switch means are all connected in series with each other.

The phootosensitive means $PV_1$ forms an internal photosensitive means since this photosensitive means receives a light input 1 coming from the object which is to be photographed and traveling through the objective of the camera, as schematically shown in FIG. 1*a*, before reaching the photosensitive means $PV_1$. Thus, the light input 1 shown in FIG. 1*a* is the light which reaches the internal photosensitive means $PV_1$ after the light has passed through the objective of the camera. As is well known this light, in the case of a single lens reflex camera, will be reflected by a tiltable mirror to the internal photosensitive means $PV_1$.

The other photosensitive means $PV_2$ is an external photosensitive means, in that it receives a light input 2 also coming from the object which is to be photographed, but the light input 2 does not travel through the objective of the camera before reaching the external photosensitive means $PV_2$. Thus, this external photosensitive means $PV_2$ will be situated behind a window at an exterior wall of the camera, facing the same direction as the objective, so as to receive the light directly from the object to be photographed. Therefore the photosensitive means $PV_2$ is referred to as an external photosensitive means. Thus, the light input 2 will be different from the light input 1 because the latter light input has first passed through the objective before reaching the internal photosensitive means.

In response to light input 1, the photosensitive means $PV_1$ provides an output voltage $V_1$ which, based on the light measurement conditions include the optical characteristics of the objective system of the camera and the photoelectric transformation characteristics of the photosensitive means $PV_1$, is proportional to the logarithm of the light input intensity from the object which is to be photographed. On the other hand, the photosensitive means $PV_2$ will produce an output voltage $V_2$, which, based on the light measurement conditions and the photoelectric transformation characteristics of the photosensitive means or light receiving element $PV_2$, is proportional to the logarithm of the light input intensity from the object to be photographed.

Accordingly, when the switch means $SW_M$ is closed, there is a voltage $V_3$ across the capacitor means $C_M$ which is equal to the difference between the voltage $V_1$ and $V_2$. It is clear, therefore, that this output voltage $V_3$ corresponds to the difference between the light input intensities from the object to be photographed based upon the respective light measurement characteristics of the light inputs 1 and 2. The voltage $V_3$ across the capacitor means $C_M$ has a value which varies in accordance with the different light measurement conditions. Thus, this value is determined by the optical properties of the objective of the camera, the condition of light distribution at the object which is to be photographed, and the condition of distribution of the pattern of brightness of the object to be photographed.

When the switch means $SW_M$ is displaced from its illustrated closed position to an open position, then there is a given output voltage at the point P, and this output voltage is equal to the sum of the voltages $V_2$ and $V_3$. At the terminals designated $V_{out}$ the circuit has an output means which provides an output signal used in the computation of the extent to which the film of the camera will be exposed. Thus, this output means $V_{out}$ corresponds to the voltage at the point P and is equal to the photoelectric transformation output voltage $V_1$ which is proportional to the logarithm of the light input intensity from the object to be photographed and passing through the objective of the camera. Therefore, the output voltage means $V_{out}$ at the point P provides a signal which is compensated in accordance with the internal measurement of light. In other words, the signal provided by the output means $V_{out}$ is determined by the output of the external photosensitive means $PV_2$ as influenced by the charge on the capacitor means $C_M$, which compensates this output from the external photosensitive means $PV_2$ in accordance with the output from the internal photosensitive means $PV_1$. When the switch $SW_M$ opens, the charge stored at the capacitor means $C_M$ is retained to provide the above compensation of the output from the external photosensitive means $PV_2$. Thus, the compensation value is memory-retained as a voltage across the capacitor means $C_M$. The internal photosensitive means will receive the light input 1 only during an interval which extends up to but which does not include the actual exposure of the film since the mirror of the single lens reflex camera will swing up to prevent light from continuing to reach the photosensitive means $PV_1$ during actual film exposure. However, the external photosensitive means $PV_2$ will continue to receive light not only prior to but also during actual exposure of the film. The switch $SW_M$ opens simultaneously with the swinging upwardly of the mirror which directs light to the internal photosensitive means, so that the charge stored at the capacitor means $C_M$ enables the above compensation to be carried out in accordance with the internally measured light even though the travel of light to the internal photosensitive means has terminated during actual exposure of the film.

Figure 1B:
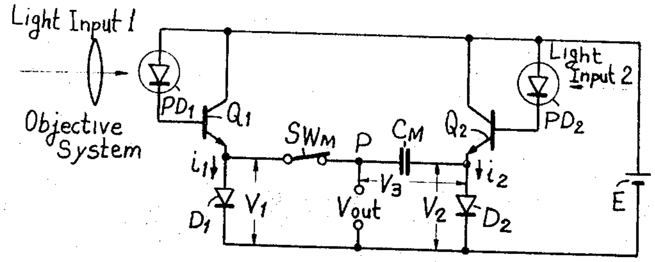

In the embodiment of the invention which is illustrated in FIG. 1*b*, the pair of photosensitive means use as light-receiving elements phototransistors $PD_1$ and $PD_2$. These phototransistors of the internal and external photosensitive means are respectively electrically connected through current amplifying transistors $Q_1$ and $Q_2$ to logarithmic transformation elements, such as diodes $D_1$ and $D_2$, respectively, as illustrated. Thus, in this case it is the light receiving element $PD_1$ together with the transistor $Q_1$ and the diode $D_1$ which forms the internal photosensitive means which receives light input 1 after the latter has passed through the objective system of the camera. In the same way the external photosensitive means includes the light-receiving element $PD_2$ as well as the current amplifying transistor $Q_2$ and the diode $D_2$. The light input 1 received by the phototransistor $PD_1$ is transformed into a photocurrent. This current is amplified by the transistor $Q_1$ so that an output current $i_1$ which is proportional to the light input intensity is obtained as the emitter current of the transistor $Q_1$. This output current $i_1$ is logarithmically compressed by the logarithmic transformation element $D_1$, so that the internal photosensitive means of FIG. 1*b* will provide an output voltage $V_1$ which is proportional to the logarithm of the light input intensity, and this output voltage is produced across the element $D_1$. In the same way the light input 2 received by the external photosensitive means is acted upon by the photodiode $PD_2$, the transistor $Q_2$, and the logarithmic transformation element $D_2$. As a result, the external photosensitive means of FIG. 1*b* provides an output voltage $V_2$ which is proportional to the logarithm of the light input intensity, and this output voltage $V_2$ is produced across the logarithmic transformation element $D_2$.

With the photoelectric transformation characteristic determined by the photodiode $PD_1$ and the logarithmic transformation element $D_1$ equal to that of the photodiode $PD_2$ and the logarithmic transformation element $D_2$, there are results achieved in the same way as in the embodiment of FIG. 1*a* with the output means $V_{out}$ providing the output voltage signal as described above in connection with FIG. 1*a*.

In the case of FIG. 1*b* the transistors $Q_1$ and $Q_2$ are used to amplify the photocurrent so as to increase the measured light sensitivity. However, it is clear that the above operations will also be achieved even if the transistors $Q_1$ and $Q_2$ are not provided.

Figure 1C:
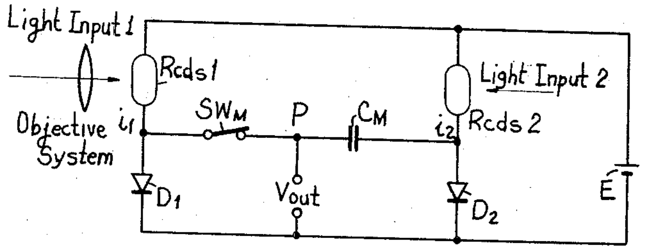

In the embodiment of FIG. 1*c* the internal photosensitive means includes a light-receiving element in the form of a photoconductor element such as a CdS element. Thus, the light input 1 after passing through the objective system of the camera is received by the photoconductor element $R_{CdS1}$ which together with the diode $D_1$ forms the internal photosensitive means of the embodiment of FIG. 1*c*. In the same way the external photosensitive means is formed by a photoconductor element $R_{CdS2}$ which may also be an element such as a CdS element, and this element of the external photosensitive means is electrically connected with the diode $D_2$ in order to form therewith the external photosensitive means which receives the light input 2 as schematically shown in FIG. 1*c*. When the photoelectric transformation characteristic determined by the photoconductor element $R_{CdS1}$ and the logarithmic compression characteristic of the logarithmic transformation element $D_1$ are equal to the photoelectric transformation characteristics determined by the photoresistance characteristic of the photoconductor element $R_{CdS2}$ and the logarithmic compression characteristic of the logarithmic transformation element $D_2$, then it is clear that the circuit of FIG. 1*c* will also operate to achieve the results described above in connection with FIG. 1*a* and thus the output means $V_{out}$ will provide an output signal where the voltage from the external photosensitive means is compensated by way of the capacitor means in accordance with the light measured by the internal photosensitive means. It is to be noted that in the case of FIGS. 1*b* and 1*c* a battery E is also illustrated.

Figure 1D:
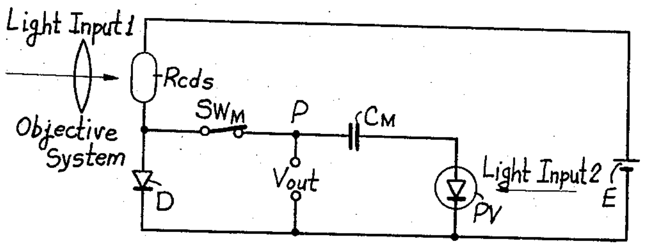

In the embodiment of FIG. 1*d*, the pair of photosensitive means respectively have light-receiving elements which are different from each other. Thus, in the example illustrated the internal photosensitive means includes a photoconductor element $R_{CdS}$ while the external photosensitive means includes a photovoltaic element PV having a PN junction characteristic such as a silicon photocell of the type used in the embodiment of FIG. 1. In this case also, as described above in connection with the other embodiments, if the photoelectric transformation characteristics determined by the photo-resistance characteristic of the photoconductor element $R_{CdS}$ and the logarithmic compression characteristic of the logarithmic transformation element D of the internal photosensitive means is equal to the photoelectric transformation characteristic of the photovoltaic element PV then it is clear that the output signal provided by the output means $V_{out}$ at the point P will be the same as that achieved above in the embodiment of FIG. 1*a*, for example. Thus, in connection with the various embodiments of a fundamental circuit of the invention as described above and shown in FIGS. 1*a*–1*d*, if the photoelectric transformation characteristics of the internal and external photosensitive means formed by the two different light input systems are respectively proportional to the logarithm of the light input intensities and are equal to each other, then either a photovoltaic element or a photoconductor element may be used as a light receiving element for either of the photosensitive means.

In order to achieve the desired results, the capacitor means is charged with the difference between the logarithmically compressed voltage outputs resulting from the treatment of the light inputs 1 and 2 by the internal and external photosensitive means described above. As a result there will be cases where the response speed is undesirably slow. In order to retain the compensating voltage at the capacitor means for a relatively long time, a greater capacitance value for the capacitor means is desired, but a greater capacitance value results in a slower response speed. Also in the case where the light input is relatively small, the internal resistance of each photoelectric transformation output element increases and the response speed also becomes undesirably slow.

Figure 2A:
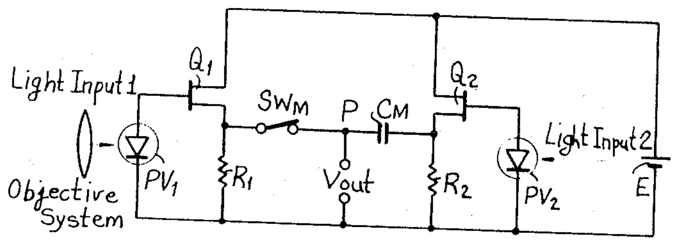
FIGS. 2*a* and 2*b* respectively illustrate circuits of practical examples according to the present invention.

This latter problem is solved with an arrangement according to the invention as illustrated in FIG. 2*a*. In this embodiment of the invention the internal and external photosensitive means respectively include the light-receiving elements $PV_1$ and $PV_2$ which may be similar to those of FIG. 1*a* and which respectively receive light inputs in the same way. These light-receiving elements are in this embodiment respectively connected with buffer circuits which also form part of the internal and external photosensitive means and which have a high input resistance and low output resistance characteristic. Thus, the buffer circuit of the internal photosensitive means includes the field effect transistor $Q_1$ and the resistor $R_1$, while the buffer circuit of the external photosensitive means includes the field effect transistor $Q_2$ and the resistor $R_2$. Otherwise the embodiment of FIG. 2*a* will behave in the same manner as that of FIG. 1*a*, and the output voltages of the internal and external photosensitive means will have the difference therebetween stored by the capacitor means $C_M$ with an output being achieved by the output means $V_{out}$ in the manner described above. In the embodiment of FIG. 2*a* the photoelectric transformation output characteristic determined by the photoelectric transformation characteristic of the light-receiving element $PV_1$ and the voltage gain of the buffer circuit constituted by the field effect transistor $Q_1$ and the resistor $R_1$ is equal to the photoelectric transformation output characteristic determined by the photoelectric transformation characteristic of the light-receiving element $PV_2$ and the voltage gain of the buffer circuit constituted by the field effect transistor $Q_2$ and the resistor $R_2$. Thus, in this case also the internal and external photosensitive means will have identical photoelectric transformation characteristics.

In actual practice, it is difficult to select light-receiving elements of equal photoelectric transformation characteristics or to select a set of photoconductor elements and a logarithmic transformation element when a photovoltaic element is used as one light-receiving element and the photoconductor element and logarithmic transformation element form the other photosensitive means. In order to eliminate the disadvantages which might be encountered in practice with such an arrangement, it is possible to adjust the voltage gain of the pair of buffer circuits. This is achieved by replacing the resistors $R_1$ and $R_2$ with variable resistors.

Figure 2B:
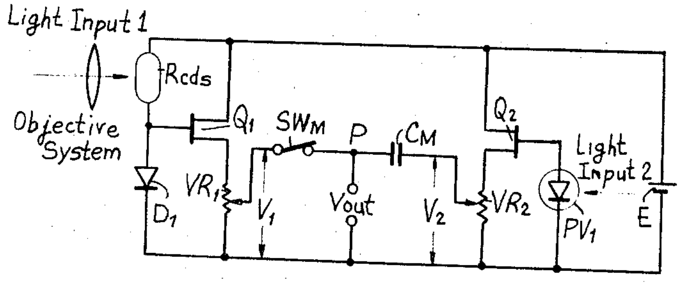

An example of this latter type is illustrated in FIG. 2*b*. In this embodiment of the invention the photoconductor light-receiving element $R_{Cds}$ is used as a light-receiving element of an internal photosensitive means which includes the diode $D_1$ which forms a logarithmic compression element, this structure behaving in the same way as the internal photosensitive means of the embodiment of FIG. 1*c*. However, in FIG. 2*b*, the external photosensitive means is formed by a photovoltaic element $PV_1$ having a PN junction, so that the external photosensitive means of FIG. 2*b* is completely different from the internal photosensitive means. The internal and external photosensitive means of FIG. 2*b* respectively include the field effect transistors $Q_1$ and $Q_2$ as well as the variable resistors $VR_1$ and $VR_2$, so that the output voltages $V_1$ and $V_2$ will be treated through the capacitor means $C_M$ in the manner described above in connection with FIG. 1*a*, for example, to achieve at the output means $V_{out}$ an output signal which can be used for computing the proper extent of exposure of film in the camera. It is to be understood that the internal and external photosensitive means of FIG. 2*b* could be reversed if desired.

In any event, with respect to the light input 1, the photoelectric transformation output characteristic is determined by the photoconductive element $R_{Cds}$, the logarithmic transformation element $D_1$, the field effect transistor $Q_1$ and the variable resistor $R_1$, all of which form the internal photosensitive means of FIG. 2*b*. On the basis of this latter characteristic there is achieved a voltage output $V_1$ at the sliding contact terminal of the variable resistor $VR_1$. On the other hand, with respect to the light input 2, the photoelectric transformation output characteristic determined by the photovoltaic element $PV_1$, the field effect transistor $Q_2$, and the variable resistor $VR_2$, all of which form the external photosensitive means, provide a voltage output $V_2$ which is based on this characteristic and which is obtained at the sliding contact terminal of the variable resistor $VR_2$. The voltage gain of each buffer circuit is determined in such a way that variations of the voltage outputs $V_1$ and $V_2$ resulting from object brightness variation are equal to each other. In this way it is possible to compensate as desired the photoelectric transformation characteristics of the light-measurement circuit sections of two different kinds of photosensitive means having different types of light-receiving elements.

Thus, for each light measurement section there is provided an independent variable gain amplifier, and through this circuit means and its action which are of the same type as illustrated in FIG. 1*a*, an output voltage $V_{out}$ as referred to above is achieved. Thus, it is not essential to individually select and combine identical light-receiving elements. The photoelectric transformation output characteristics are compensated as desired by properly determining the gain of the variable gain amplifier. This is highly advantageous in connection with mass production of the structure of the invention.

It is of course also possible very readily to provide a construction which has a photoelectric transformation output characteristic compensating circuit as shown in FIG. 2*b* as well as a buffer circuit as shown in FIG. 2*a*. The description of such a circuit is omitted inasmuch as it is readily understandable from the above-described embodiments of the invention.

Figure 3:
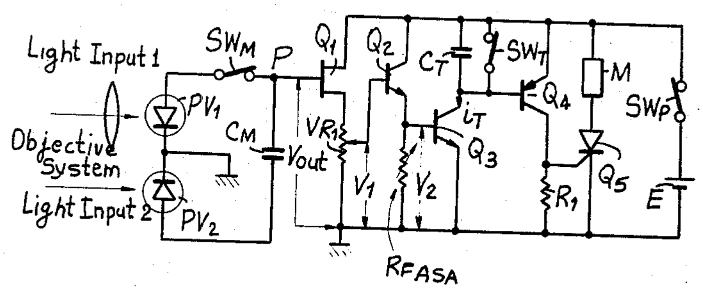
FIG. 3 illustrates an embodiment of an electrical shutter-control circuit for a single lens reflex camera according to the present invention.

FIG. 3 illustrates an embodiment of the invention as applied to an electric shutter control circuit for a single lens reflex camera. It is to be understood that the output means $V_{out}$ of any of the above embodiments may be applied in the same way to achieve a computation, in an automatic manner, of the extent to which the film is exposed.

Referring now to FIG. 3, the circuit illustrated therein includes the current source E, the current source switch $SW_P$, the capacitor-controlling switch $SW_M$, and a timing switch $SW_T$. These latter switches $SW_M$ and $SW_T$ are normally closed. The embodiment of FIG. 3 further illustrates the light-receiving elements $PV_1$ and $PV_2$ of the internal and external photosensitive means, these light-receiving elements being in the form of silicon photocells, for example, which have equal photoelectric transformation characteristics.

When light measurement is to be made, the current source switch $SW_P$ is closed. Then the light input from the object which is to be photographed is applied in the form of light input 1 through the objective system of the camera to the light-receiving element $PV_1$ of the internal photosensitive means, and the light input 2 is received on the object to be photographed by the light-receiving element $PV_2$ of the external photosensitive means. Then, as described above, there is achieved at the point P an output voltage providing an output signal provided by the output means $V_{out}$. It is this signal which is used in the computation of the extent to which the film is exposed. The photoelectric transformation output voltage $V_{out}$ corresponds to the light measurement value as obtained through the camera objective system. This photoelectric transformation output voltage $V_{out}$ is applied to the high input resistance variable gain amplifier formed by the field effect transistor $Q_1$ and the variable resistor $VR_1$. The output voltage $V_1$ of this latter amplifier and variable resistor forms the input to a buffer circuit formed by the transistor $Q_2$ and the variable resistor $R_{F\ ASA}$. This circuitry forms an electronic computer means and will carry out a photographic computation with variables such as the brightness of the light at the object to be photographed, the setting of the diaphragm or aperture, and the film speed, the variable resistor $R_{F\ ASA}$ being set to introduce the latter factors into the circuit. The output voltage $V_2$ from this latter part of the circuit is then applied to the transistor $Q_3$ for logarithmic expansion, so that the latter transistor forms a part of the electronic computer means for logarithmically transforming the output back to the condition which it would have if there were no logarithmic transformation.

The variable resistor $VR_1$ is adjusted in such a way that the collector current $i_T$ of the transistor $Q_3$ is proportional to the light input intensity from the object. Then the output voltage $V_1$ has a value, in accordance with the APEX system, corresponding to the value $B_V$ of object brightness B. The computation circuit includes the transistor $Q_2$ which is provided with a load in accordance with the setting of the variable resistor $R_{F\ ASA}$, according to the diaphragm setting and film speed, this latter setting of the latter variable resistor being determined in accordance with the result of a photographic computation $A^2/S$ where A is the diaphragm setting and S is the film speed value. When the voltage output $V_1$ corresponding to the value $B_V$ is applied as an input to this computation circuit, the diode action performed between the base and the emitter of the transistor $Q_2$ causes the value $A^2/S$ to be transformed into a logarithmically compressed emitter voltage value of the transistor $Q_2$. Assuming that the logarithmic compression characteristic is determined in such a way as to establish, in accordance with the APEX system, the value $S_V - A_V$ then the emitter voltage $V_2$ of the transistor $Q_2$ corresponds to the electrical amount resulting from the photographic computation $B_V + S_V - A_V$, based upon values in accordance with the APEX system, and accordingly this voltage $V_2$ is a voltage output corresponding to the value $T_V$. This latter output voltage $V_2$ corresponding to the value $T_V$ is logarithmically expanded by the transistor $Q_3$ and provides an output in the form of the collector current $i_T$.

During operation of the camera in connection with an exposure of the film, to carry out a photographing operation, the movement of the shutter-tripping button just before swinging up of the mirror is transmitted through a suitable driving connection to the switch $SW_M$ to displace the latter to its open position. Then, in synchronism with the start of the movement of the leading curtain of the focal plane shutter, caused by the upward swinging of the mirror, the timing switch $SW_T$ is displaced from its closed to its open position. As a result the timing capacitor $C_T$ is charged by the collector current $i_T$.

The illustrated circuitry includes a switching circuit section consisting of the transistor $Q_4$, an SCR $Q_5$, a resistor $R_1$ and an electromagnet M. In order to control the instant when the trailing curtain of the focal plane shutter starts to run so as to terminate the exposure, the capacitance of the timing capacitor $C_T$ or the threshold value of the switching circuit section are selected in such a way that the time required for the voltage across the capacitor $C_T$ to reach the threshold value of the switching circuit is an exposure time corresponding to the value $T_V$. In this way a proper exposure time is automatically obtained.

Thus, as described in detail above, with an electric shutter control circuit for an internally light-receiving type of single lens reflex camera having a light-measurement circuit system according to the present invention, when carrying out a photographic operation, on the basis of information in accordance with object brightness just prior to shutter release, the light-measurement difference between the internal and external photosensitive or light-receiving systems is stored by the memory capacitor means as an electrical quantity. Then, on the basis of this stored differential value, the light measurement value obtained by the external photosensitive means is compensated into that according to the internal photosensitive means. The exposure time is thus controlled in accordance with this compensated value. In this way a proper exposure is obtained through proper exposure control even when the brightness at the object to be photographed continues to vary during the time subsequent to tilting up of the mirror and continuing during actual exposure of the film. Extremely good results are obtained in the case where auxiliary light such as artificial flash illumination is utilized.

According to the light measurement circuit system of the present invention, the temperature dependencies of the light-receiving elements cancel each other to bring about compensation of any inaccuracies which might result due to temperature fluctuations. Therefore, when elements of the same kind are utilized for the light-receiving elements or when the photosensitive means is formed by a combination of a light-receiving element and a logarithmic transformation element, extremely good results are achieved with respect to the circuit characteristics. Either a photovoltaic element or a photoconductive element can be utilized as a light-receiving element, and the photoelectric transformation characteristics of each light-receiving element is very readily compensated to achieve the desired high degree of accuracy in the operation. Thus, a great advantage is achieved with the present invention particularly with respect to mass production of circuits of the type referred to above.

What is claimed is:

1. In a camera, internal photosensitive means for receiving a light input from an object to be photographed after the light input has passed through an objective of the camera and for providing from said light input a corresponding logarithmically transformed output, external photosensitive means for receiving from the object which is to be photographed a light input which does not pass through the objective of the camera and for converting the latter light input into a corresponding logarithmically transformed output, both of said photosensitive means having the same photoelectric transformation characteristics, and said external photosensitive means receiving a light input during a time interval prior to and during exposure of film while said internal photosensitive means receives a light input prior to but not during exposure of film, capacitor means electrically connected between said internal and external photosensitive means for receiving a charge corresponding to the difference between said outputs, output means for providing a signal to be used in computation of the extent to which film is exposed, said output means being electrically connected with said capacitor means and said external photosensitive means for providing said signal after light input to said internal photosensitive means has terminated, whereby the signal will provide for the output from said external photosensitive means a compensation in accordance with the light input to said internal photosensitive means as determined by the charge of said capacitor means, and electronic computer means electrically connected with said output means for receiving said signal and for logarithmically transforming the signal back to the condition which it would have if logarithmic transformation did not take place.

2. The combination of claim 1 and wherein each of said photosensitive means includes a light-receiving element and a buffer circuit of high input resistance and low output resistance to provide said outputs which act on said capacitor means to charge the latter in accordance with the difference between said outputs.

3. The combination of claim 1 and wherein each of said photosensitive means includes a light-receiving element and a variable gain amplifier having a high input resistance and a low output resistance to produce said outputs used to charge said capacitor means so that the latter will store the difference between said outputs.

4. The combination of claim 1 and wherein a switch means is connected between said capacitor means and said internal photosensitive means for disconnecting only the latter from said capacitor means just prior to exposure of film.

5. The combination of claim 1 and wherein both of said photosensitive means are identical.

6. The combination of claim 1 and wherein said external and internal photosensitive means are different from each other, one of said photosensitive means including a variable resistor connected to said one photosensitive means for providing for the latter photoelectric transformation characteristics identical with that of the other photosensitive means.

7. The combination of claim 1 and wherein both of said photosensitive means are connected in series with each other and with said capacitor means.

8. The combination of claim 7 and wherein a switch means is connected between said internal photosensitive means and said capacitor means for disconnecting only said internal photosensitive means from said capacitor means just prior to exposure of film.

9. The combination of claim 1 and wherein said internal and external photosensitive means respectively include different types of light-receiving elements and variable resistors respectively connected thereto for providing equal photoelectric transformation characteristics.

* * * * *